US009593210B1

(12) United States Patent
Rubinsztajn et al.

(10) Patent No.: US 9,593,210 B1
(45) Date of Patent: Mar. 14, 2017

(54) METHODS OF PREPARING POLYSILAZANE RESIN WITH LOW HALOGEN CONTENT

(71) Applicant: GENERAL ELECTRIC COMPANY, Schenectady, NY (US)

(72) Inventors: Slawomir Rubinsztajn, Ballston Spa, NY (US); Eric James Pressman, West Stockbridge, MA (US); Ryan Christopher Mills, Rexford, NY (US); Peter Kennedy Davis, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 15/135,604

(22) Filed: Apr. 22, 2016

Related U.S. Application Data

(60) Provisional application No. 62/170,403, filed on Jun. 3, 2015.

(51) Int. Cl.
 *C08G 77/62* (2006.01)
 *C04B 35/622* (2006.01)
 *C09D 183/14* (2006.01)

(52) U.S. Cl.
 CPC ........ *C08G 77/62* (2013.01); *C04B 35/62281* (2013.01); *C04B 35/62295* (2013.01); *C09D 183/14* (2013.01)

(58) Field of Classification Search
 None
 See application file for complete search history.

(56) References Cited

U.S. PATENT DOCUMENTS

| | | | | | |
|---|---|---|---|---|---|
| 4,340,619 A | * | 7/1982 | Gaul, Jr. | ................ | B82Y 30/00 264/29.2 |
| 4,404,153 A | | 9/1983 | Gaul, Jr. | | |
| 4,666,872 A | * | 5/1987 | Baney | ................... | C04B 35/571 501/88 |
| 4,668,642 A | * | 5/1987 | Bujalski | ................ | C04B 35/571 501/88 |
| 4,675,424 A | * | 6/1987 | King, III | ................ | C04B 35/589 423/344 |
| 4,689,382 A | * | 8/1987 | Lebrun | ................. | C04B 35/571 501/154 |
| 4,745,205 A | * | 5/1988 | Haluska | ................ | C04B 35/571 556/412 |
| 4,767,831 A | * | 8/1988 | Bartos | ................... | C04B 35/589 264/236 |
| 4,792,591 A | * | 12/1988 | Rengstl | ................... | C08G 77/60 525/477 |
| 4,847,027 A | * | 7/1989 | Lu | ........................ | C04B 35/571 264/625 |
| 4,866,149 A | * | 9/1989 | Lebrun | ................. | C04B 35/589 525/474 |
| 5,008,422 A | * | 4/1991 | Blum | ...................... | C04B 35/16 556/402 |
| 5,037,933 A | * | 8/1991 | Lebrun | ................. | C04B 35/571 528/12 |
| 5,124,283 A | * | 6/1992 | Lebrun | ................. | C04B 35/571 501/88 |
| 5,200,371 A | | 4/1993 | Takeda et al. | | |
| 5,268,496 A | * | 12/1993 | Geisberger | ............ | C04B 35/589 528/21 |
| 5,288,444 A | * | 2/1994 | Goldberg | .............. | F27D 1/0009 264/624 |
| 6,329,487 B1 | * | 12/2001 | Abel | ...................... | C08G 77/62 528/21 |
| 8,466,076 B2 | * | 6/2013 | Ruedinger | ........ | C04B 35/62281 264/433 |
| 2008/0090988 A1 | * | 4/2008 | Nakazawa | ............ | C08G 77/62 528/31 |
| 2011/0212329 A1 | | 9/2011 | Pope et al. | | |
| 2011/0263887 A1 | * | 10/2011 | Oishi | .................... | C07F 7/0863 556/409 |
| 2014/0353868 A1 | * | 12/2014 | Rubinsztajn | ........... | C08G 77/54 264/85 |
| 2015/0004421 A1 | * | 1/2015 | Fujiwara | ............... | C23C 18/122 428/447 |
| 2015/0225509 A1 | * | 8/2015 | Richter | .................. | C08G 77/62 524/113 |
| 2015/0247265 A1 | * | 9/2015 | Mills | ..................... | D01D 10/02 264/211.15 |

FOREIGN PATENT DOCUMENTS

EP 0412914 A1 2/1991

* cited by examiner

*Primary Examiner* — Robert S Loewe
(74) *Attorney, Agent, or Firm* — Paul J. DiConza

(57) ABSTRACT

Methods of producing low-halogen-containing polysilazane resins, which are used to make silicon carbide fibers and ceramic coatings, provide processes for removing halogens, including chlorine, from precursor polysilazane resins.

22 Claims, No Drawings

METHODS OF PREPARING POLYSILAZANE RESIN WITH LOW HALOGEN CONTENT

TECHNICAL FIELD

The present disclosure generally relates to methods of forming polysilazane resins with low halogen content. In some specific embodiments, the present disclosure relates to polydisilazane resins made by such methods, and to ceramic fibers and coatings formed from such resins.

BACKGROUND

Polydisilazane resins are precursors to silicon carbide and silicon nitride fibers and coatings. These resins must be formulated such that they may be processed into the desired shape (for instance, a fiber), while being stable enough to allow resin storage, hot melt spinning, cure and post-spinning handling processes without significant change in composition The chlorine content in a polydisilazane resin, such as that obtained by a process described in US 2011/0212329 (Pope et al.), is typically above 1 wt %. The resulting resin has low stability both in solution and during the melt spinning process to make fibers. These high halogen resins will react with moisture and hydrolyze, resulting in an unstable fiber spinning process or coating application and substantial incorporation of oxygen. Because of this, the presence of high halogen content requires that the spinning and other steps cannot be performed in an open atmosphere.

Various methods have been used to attempt to reduce halogen concentration in polysilazane resins. Many of these methods, such as that shown in U.S. Pat. No. 5,200,371 (Takeda et al.), utilize chemicals that are toxic to workers, such as ammonia. Such processes present several environmental health and safety challenges and are expensive due to the toxic nature of the reagents.

Therefore, a non-toxic, cost-effective process is needed for the production of polysilazane resins.

BRIEF DESCRIPTION

The present disclosure provides, in a first aspect, a method for preparing a substantially halogen-free polysilazane resin. This method includes reacting a precursor polysilazane resin containing more than 1 wt % of halogen with hexaalkyldisilazane in the presence of a catalytic amount of at least one of a strong acid or a salt of a strong acid.

The present disclosure provides, in a second aspect, a method for preparing a substantially halogen-free polysilazane resin. This method includes reacting at least one alkylchlorodisilane with excess hexaalkyldisilazane in the presence of a catalytic amount of at least one of a strong acid or a salt of a strong acid.

The present disclosure provides, in a third aspect, a method for removing halogen from a precursor polysilazane resin containing more than 1 wt % of halogen. This method includes reacting the precursor polysilazane resin with hexamethyldisilazane in the presence of a catalytic amount of at least one of a strong acid or a salt of a strong acid.

The present disclosure provides, in a fourth aspect, a preceramic fiber formed from a substantially halogen-free polysilazane resin produced by a method disclosed herein.

The present disclosure provides, in a fifth aspect, a preceramic coating formed from a substantially halogen-free polysilazane resin produced by a method disclosed herein.

The present disclosure provides, in a sixth aspect, a silicon carbide fiber formed from a substantially halogen-free polysilazane resin produced by a method disclosed herein.

The present disclosure provides, in a seventh aspect, a method for removing halogen from a precursor polysilazane resin containing more than 1 wt % of halogen. This method includes reacting the precursor polysilazane resin with at least one disilazane in the presence of a catalytic amount of at least one of a strong acid or a salt of a strong acid.

These and other objects, features and advantages of this disclosure will become apparent from the following detailed description of the various aspects of the disclosure taken in conjunction with the accompanying drawings.

DETAILED DESCRIPTION

Each embodiment presented below facilitates the explanation of certain aspects of the disclosure, and should not be interpreted as limiting the scope of the disclosure. Moreover, approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value.

In the following specification and claims, the singular forms "a", "an" and "the" include plural referents unless the context clearly dictates otherwise. As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

The disclosure relates to the synthesis of a polysilazane resin which is substantially free of halogen. This resin, typically containing less than 0.2 wt % of halogen, shows high long-term stability in solution (e.g., in methylene chloride) and during the melt spinning process. The polysilazane resin is produced by reacting a precursor polysilazane resin with high halogen content with an excess of hexamethyldisilazane in the presence of catalytic amount of at least one of a strong acid and/or an ammonium salt of a strong acid. The catalyst promotes removal of residual chlorosilanes (or other halosilanes) from the polysilazane resin. The obtained low halogen polysilazane resin has good resistance to hydrolysis and good stability during a melt spin to form preceramic fibers with low content of oxygen.

Costs to the producer are easily controlled using the disclosed process for three main reasons. First, the spinning can be performed at ambient conditions. Second, the disclosed process is simple and easy to implement in the existing reactor used in the synthesis of polysilazane resin. Finally, the ammonium salts of acids utilized in the disclosed process are less toxic than the chemicals used in existing methods.

The present disclosure provides, in a first aspect, a method for preparing a substantially halogen-free polysilazane resin. This method includes reacting a precursor polysilazane resin containing more than 1 wt % of halogen with hexaalkyldisilazane in the presence of a catalytic amount of at least one of a strong acid or a salt of a strong acid.

In some embodiments, the precursor polysilazane resin contains more than 1 wt % of halogen. In other embodiments, the precursor polysilazane resin contains between 1 wt % and 5 wt % of halogen. In still other embodiments, the precursor polysilazane resin contains between 1 wt % and 3 wt % of halogen. In yet other embodiments, the precursor polysilazane resin contains between 3 wt % and 5 wt % of halogen. In some embodiments, the precursor polysilazane resin contains between 2 wt % and 5 wt % of halogen. In other embodiments, the precursor polysilazane resin contains between 2 wt % and 4 wt % of halogen. In still other embodiments, the precursor polysilazane resin contains between 1 wt % and 2 wt % of halogen. Before the polymer is made (i.e., when there are unreacted monomers) the halogen content may be as high as 20% by weight.

In other embodiments, the halogen is chlorine.

In some embodiments, the precursor polysilazane resin is reacted in the presence of a catalytic amount of one or more strong acids. In some embodiments, the precursor polysilazane resin is reacted in the presence of a catalytic amount of a strong acid. In some embodiments, the strong acid is trifluoromethanesulfonic (triflic) acid. In other embodiments, the strong acid is perchloric acid. In still other embodiments, the strong acid is hydroiodic acid. In yet other embodiments, the strong acid is hydrobromic acid. In some embodiments, the strong acid is sulfuric acid. In other embodiments, the strong acid is fluorosulfuric acid. As used herein, a strong acid is an acid with a pKa of less than about −2.5.

In some embodiments, the precursor polysilazane resin is reacted in the presence of a catalytic amount of one or more salts of a strong acid. In some embodiments, the salt of a strong acid is an ammonium salt. In some embodiments, the salt of a strong acid is a simple ammonium salt [e.g., $NH_4^{(+)}A^{(-)}$ (wherein A is conjugate base of a strong acid such as $SO_3CF_3^-$, $ClO_4^-$, $I^-$)]. In other embodiments, the salt of a strong acid is a primary ammonium salt [for example, $NRH_3^{(+)}A^{(-)}$, wherein R is an alkyl or aryl substituent]. In still other embodiments, the salt of a strong acid is a secondary ammonium salt [$NR_2H_2^{(+)}A^{(-)}$]. In yet other embodiments, the salt of a strong acid is a tertiary ammonium salt [$NR_3H^{(+)}A^{(-)}$]. In further embodiments, the salt of a strong acid is a quaternary ammonium salt [$NR_4^{(+)}A^{(-)}$]. Some of these salts may have better solubility in organic medium than simple ammonium salt.

In some embodiments, the ammonium salt of a strong acid is the ammonium salt of trifluoromethanesulfonic acid ($HSO_3CF_3$, triflic acid, HTf). In some embodiments, the ammonium salt of a strong acid is $NH_4^{(+)}Tf^{(-)}$. The ammonium salt of the trifluoromethanesulfonic acid is an easy to handle solid with low toxicity.

In some embodiments, the catalytic amount of the at least one strong acid or salt of a strong acid is present in an amount between 0.001 wt % and 1 wt %. In other embodiments, the catalytic amount of the at least one strong acid or salt of a strong acid is between 0.001 wt % and 0.01 wt %. In still other embodiments, the catalytic amount of the at least one strong acid or salt of a strong acid is between 0.01 wt % and 0.1 wt %. In yet other embodiments, the catalytic amount of the at least one strong acid or salt of a strong acid is between 0.005 wt % and 0.05 wt %. In some embodiments, the catalytic amount of the at least one strong acid or salt of a strong acid is between 0.005 wt % and 0.01 wt %. In some embodiments, the catalytic amount of the at least one strong acid or salt of a strong acid is between 0.01 wt % and 0.05 wt %. In some of these embodiments, the catalytic amount of the at least one strong acid or salt of a strong acid is present in an amount between 0.001 wt % and 0.05 wt %.

In some embodiments, the precursor polysilazane resin is formed by combining at least one organochlorosilane monomer and at least one silazane, primary amine, or ammonia, or combination thereof. In other embodiments, the precursor polysilazane resin is formed by combining at least one organochlorosilane monomer and at least one disilazane. While amines will work for the purpose of this disclosure, there is an advantage to using disilazanes over amines: the byproduct of the reaction using disilazane is low boiling organochlorosilane, which is removed from the reaction medium by distillation. The reaction of chlorosilanes with amines and ammonia will produce HCl; this will form solid ammonium salt which subsequently has to be filtered out, resulting in an additional process step.

In some embodiments, the organochlorosilane monomer is selected from phenyltrichlorosilane, diphenyldichlorosilane, methylphenyldichlorosilane, vinylmethyldichlorosilane, vinyltrichlorosilane, methyltrichlorosilane, silicon tetrachloride, methylchlorodisilane, and/or a mixture of methylchlorodisilanes.

In some embodiments, the disilazane is selected from hexaalkyldisilazane containing from one to four carbons in the alkyl portions (such as hexamethyldisilazane), tetramethyldivinyldisilazane, and/or tetramethyldisilazane.

In some embodiments, the reacting is performed at a temperature between 80° C. and 150° C. In other embodiments, the reacting is performed at a temperature between 80° C. and 130° C. In some embodiments, the reacting is performed at a temperature between 100° C. and 130° C. In other embodiments, the reacting is performed at a temperature between 120° C. and 150° C. In still other embodiments, the reacting is performed at a temperature between 120° C. and 130° C. In yet other embodiments, the reacting is performed at a temperature between 90° C. and 130° C. In further embodiments, the reacting is performed at a temperature between 110° C. and 150° C. In some embodiments, the reacting is performed at a temperature between 110° C. and 130° C. To be perfectly clear, the temperature discussed here is the temperature of the reaction of the high chlorine polysilazane resin with hexamethyldisilazane in the presence of strong acid or ammonium salt of strong acid.

In some embodiments, the reacting is performed under normal pressure under a blanket of dry inert gas. In other embodiments, the dry inert gas is nitrogen. In still other embodiments, the dry inert gas is argon. In yet other embodiments, the dry inert gas is helium. The reacting could be performed in an autoclave at higher temperatures, but it would be more expensive under this condition. Dry air is a less attractive option for this process, due to a potential oxidation at high temperature and strong color formation.

In some embodiments, the substantially halogen-free polysilazane resin contains less than 0.5 wt % halogen. In other embodiments, the substantially halogen-free polysilazane resin contains less than 0.4 wt % halogen. In still other embodiments, the substantially halogen-free polysilazane resin contains less than 0.3 wt % halogen. In some embodiments, the substantially halogen-free polysilazane resin contains less than 0.25 wt % halogen. In yet other embodiments, the substantially halogen-free polysilazane resin contains less than 0.2 wt % halogen. In some embodiments, the substantially halogen-free polysilazane resin contains less than 0.1 wt % halogen. In other embodiments, the substantially halogen-free polysilazane resin contains less than 0.05 wt % halogen. In still other embodiments, the substantially halogen-free polysilazane resin contains less than 0.01 wt % halogen. In other embodiments, the substantially halogen-free polysilazane resin contains less than 0.005 wt % halogen. In other embodiments, the substantially halogen-free polysilazane resin contains less than 0.001 wt % halogen. In further embodiments, the substantially halogen-free polysilazane resin contains between 0.001 wt % and 0.5 wt % halogen. In other embodiments, the substantially halogen-free polysilazane resin contains between 0.005 wt % and 0.1 wt % halogen. In yet other embodiments, the substantially halogen-free polysilazane resin contains between 0.05 wt % and 0.5 wt % halogen. In still other embodiments, the substantially halogen-free polysilazane resin contains between 0.05 wt % and 0.1 wt % halogen. In some embodiments, the substantially halogen-free polysilazane resin contains between 0.1 wt % and 0.5 wt % halogen.

In some embodiments, the preparation of the substantially halogen-free polysilazane resin involves reacting a precursor polysilazane resin containing between 1 wt % and 5 wt % of halogen with hexamethyldisilazane in the presence of between 0.001 wt % and 0.1 wt % of at least one of triflic acid or an ammonium salt of triflic acid, at a temperature between 80° C. and 150° C. In some of these embodiments, the triflic acid or ammonium salt of triflic acid is present in an amount between 0.001 wt % and 0.05 wt %. In some of these embodiments, the ammonium salt of triflic acid is $NH_4^{(+)}Tf^{(-)}$. In some of these embodiments, the reaction is performed at a temperature between 100° C. and 130° C. In some of these embodiments, the reaction is performed at a temperature between 120° C. and 130° C.

In some embodiments, the polysilazane contains disilane units.

The disclosure further relates to a method for preparing a substantially halogen-free polysilazane resin, comprising reacting at least one organochlorosilane monomer with an excess of at least one disilazane and a catalytic amount of at least one of a strong acid or a salt of a strong acid.

The disclosure further relates to a method for preparing a substantially halogen-free polysilazane resin, comprising reacting at least one alkylchlorodisilane with an excess of at least one disilazane in the presence of a catalytic amount of at least one of a strong acid or a salt of a strong acid.

The disclosure further relates to a method for removing halogen from a precursor polysilazane resin containing more than 1 wt % of halogen, comprising reacting said precursor polysilazane resin with hexamethyldisilazane in the presence of a catalytic amount of at least one of a strong acid or a salt of a strong acid.

The disclosure further relates to a preceramic fiber formed from a substantially halogen-free polysilazane resin produced by any of the methods or embodiments disclosed herein.

The disclosure further relates to a preceramic coating formed from a substantially halogen-free polysilazane resin produced by any of the methods or embodiments disclosed herein.

The disclosure further relates to a silicon carbide fiber formed from a substantially halogen-free polysilazane resin produced by any of the methods or embodiments disclosed herein.

After the substantially halogen-free polysilazane resin is formed, it may be spun to form a polysilazane fiber. Polysilazane resins with high chlorine content can not be melt spinned at open system due to inevitable hydrolysis. The hydrolysis will lead to the unstable spinning process and the formation of silazane fibers with a high content of oxygen. For that reason, the polysilazane resins are converted into fibers or coatings under dry atmosphere, typically in the dry-box. Methods of spinning resin into fibers are well known in the art and are not discussed here. Any known method of spinning fibers is acceptable for purposes of this process, including those that are performed in open atmosphere: the removal of the halogen from the polysilazane resin decreases the likelihood of reaction with moisture.

The polysilazane fiber is then crosslinked to form infusible fibers and finally heated to form a silicon carbide or silicon nitride fiber. Ceramization processes are well-known in the art and will not be discussed here.

Other additives, for example, sintering agents, such as boron and boron-containing compounds, may optionally be added. For instance, a boron-containing compound such as $BCl_3$ may be added, as its presence is often desirable in later stages of the fiber-making process in order to increase the quality of the resulting fiber. It is well known that boron is an excellent sintering aid for SiC materials, allowing for manufacturing of SiC fibers with high density and fine SiC grain.

Alternatively, coatings utilizing the substantially halogen-free polysilazane resin may also be formed. Coating processes are well-known in the art and will not be discussed here, although the resins disclosed herein may be used in the open atmosphere during a coating process as well.

Unless otherwise specified, alkyl (alkylene) is intended to include linear or branched saturated hydrocarbon structures. Hydrocarbon refers to any substituent comprised of hydrogen and carbon as the only elemental constituents. Lower alkyl refers to alkyl groups of from 1 to 6 carbon atoms. Examples of lower alkyl groups include methyl, ethyl, propyl, isopropyl, butyl, s- and t-butyl and the like.

The examples presented herein are intended to be merely illustrative, and should not be construed to be any sort of limitation on the scope of the claimed invention. Unless specified otherwise, all of the components are commercially available from common chemical suppliers.

EXAMPLES

Multiple resins synthesis in the presence of ammonium triflate has been completed Example 1

Synthesis of Polydisilazane Resin

A mixture of 345 g chloromethyldisilanes, 54 g phenyltrichlorosilane, 97 g phenylvinyldichlorosilane, and 100 ml of $BCl_3$ as 1-molar solution in heptane were charged to a 1 L, 3-neck round bottomed flask equipped with mechanical stirrer, Dean-Stark trap with condenser, thermocouple, and addition funnel under atmosphere of dry nitrogen. Subsequently, 40 g of hexamethyldisilazane (HMDS) was added quickly via addition funnel. The obtained reaction mixture was slowly heated to 100° C. and 708 g of HMDS was added drop wise at 100° C. Hexane and trimethylchlorosilane, the volatile by-product of the reaction of HMDS with chlorosilanes, were removed progressively by a simple distillation as HMDS was added. The temperature of reaction was raised to 135° C. when addition of HMDS was completed. Subsequently, the reaction mixture was cooled down to 40° C. and the resulting white suspension was filtered under nitrogen through a 0.7 micron glass matt. The clarified reaction mixture was transferred back to the reactor and then slowly heated to 150° C. and subsequently to 180° C. The reaction mixture was cooled after holding for 2 hrs at 180° C. The final solid polymer was removed from the flask and ground into powder in a dry box. The final polymer has melt viscosity between 80,000 cps and 200,000 cPs at 120° C. The chlorine content was between 1.5 and 5 wt %.

The above polydisilazane resin was melt-spun in a moisture free dry-box at 150° C. to form a tow of 48 fibers with a diameter about 22 μm. The obtained fibers were cross-linked via e-beam irradiation, exposure to moisture, or heating in the presence of radical initiators. Subsequently, the crosslinked fibers were pyrolyzed in pure nitrogen at 1100° C. to yield black, glassy, ceramic fibers.

Comparative Example 1

Reaction of High Chlorine Polydisilazane (Example 1) with Ammonia 200 ml of 50% solution of the polydisilazane (example 1) in toluene was charged to a 1 L, 3-neck round bottomed flask equipped with mechanical stirrer, gas inlet, condenser and thermocouple under atmosphere of dry nitrogen. Subsequently, a large excess of ammonia was charged slowly below surface of the polymer solution via a fritted glass tube over 2 hrs at room temperature. The ammonia treated reaction mixture was slowly heated to 120° C., and toluene was removed progressively. The temperature of reaction was raised to 205° C. and held for 2 hrs. Next, the reaction mixture was cooled down to room temperature. The final solid polymer was removed from the flask and ground into powder in a dry box. Chlorine content of the final polymer is presented in Table 1.

Example 2

Reaction of High Chlorine Polydisilazane (Example 1) with HMDS in the Presence of Strong Acid 200 ml of 50% solution of the polydisilazane (example 1) in methylene chloride and 100 ml of HMDS were charged to a 1 L, 3-neck round bottomed flask equipped with mechanical stirrer, Dean-Stark trap with condenser and thermocouple under atmosphere of dry nitrogen. Subsequently, the desired amount of the strong acid was added by hypodermic syringe. The obtained reaction mixture was slowly heated to 60° C. and methylene chloride was removed progressively. The temperature of reaction was raised to 150° C. and held for 2 hrs. Next, excess HMDS and other volatiles were removed by distillation, and the reaction mixture was heated slowly to 180° C. The reaction mixture was cooled after holding for 1 hr at 180° C. The final solid polymer was removed from the flask and ground into powder in a dry box. Chlorine content of the final polymers is presented in Table 1.

Example 3

Reaction of High Chlorine Polydisilazane Precursor Resin with HMDS in the Presence of Trifluoromethane Sulfonic Acid A mixture of 127 g chloromethyldisilanes, 107 g phenyltrichlorosilane, 89 g vinyltrichlorosilane, and 100 ml of $BCl_3$ as 1-molar solution in heptane were charged to 1 L, 3-neck round bottomed flask equipped with mechanical stirrer, Dean-Stark trap with condenser, thermocouple, and addition funnel under atmosphere of dry nitrogen. Subsequently, 40 g of hexamethyldisilazane (HMDS) was added quickly via addition funnel. The obtained reaction mixture was slowly heated to 100° C. and 650 g of HMDS was added drop wise when the reaction temperature was 100° C. Hexane and trimethylchlorosilane, the volatile by-product of the reaction of HMDS with chlorosilanes, were removed progressively by a simple distillation as HMDS was added. The temperature of reaction was raised to 135° C. and held at 135° C. for 1 hr when addition of HMDS was completed to form a precursor polydisilazane resin. Subsequently, 100 ml of HMDS and catalytic amounts of trifluoromethanesulfonic acid or ammonium salt of trifluoromethanesulfonic acid were added. Next the reaction mixture was slowly heated to 150° C. and refluxed at 150° C. for 3 hrs. Subsequently, excess HMDS and other volatiles were removed by distillation and the reaction mixture was heated slowly to 180° C. The reaction mixture was cooled after holding for 2 hrs at 180° C. The final solid polymer was removed from the flask and ground into powder in a dry box. The final polymer had melt viscosity between 80,000 cPs and 200,000 cPs at 140° C. Chlorine content of the final polymers is presented in Table 1. Polydisilazane resin made by this example was melt-spun in ambient conditions (>10,000 ppm $H_2O$ atmosphere) at 120° C. to form a tow of 48 fibers with a diameter about 22 μm. During this melt-spinning trial, there was no indication of polymer instability or viscosity change, indicated by a constant melt pressure of 3 bar across the spinneret throughout the trial.

Example 4

Evaluation of the Polymer Stability 5 g of the polydisilazane resin was dissolved in 5 ml of methylene chloride. The formed solution was stored in a sealed vial for 24 hrs. Next day the solution was evaluated for cloudiness. The solutions of stable resins did not show any increase of the cloudiness over a period of 24 hrs. The high chlorine resins showed strong increase of cloudiness, which indicates resin instability. The results are summarized in Table 1.

TABLE 1

Properties of the polydisilazane resins of the examples 1, 2, and 3.

| Polysilazane resin | Additive | Catalyst | Catalyst concentration (mol/kg) | Chlorine content (wt %) | Stability of polymer solution in methylene chloride after 24hrs |
|---|---|---|---|---|---|
| Example 1 | none | none | | 1.5-5 | unstable |
| Comparative Example 1 | Ammonia | none | | 2.5 | unstable |
| Example 2 | HMDS | none | | 3.25 | unstable |
| Example 2 | HMDS | $CH_3SO_3H$ | 0.027 | 3.29 | unstable |
| Example 2 | HMDS | DMAP | 0.045 | 2.43 | unstable |
| Example 2 | HMDS | $NH_4PF_6$ | 0.008 | 3.62 | unstable |
| Example 2 | HMDS | $CF_3SO_3H$ | 0.004 | 0.24 | stable |
| Example 2 | HMDS | $NH_4CF_3SO_3$ | 0.018 | 0.23 | stable |
| Example 3 | HMDS | $NH_4CF_3SO_3$ | 0.008 | 0.019 | stable |
| Example 3 | HMDS | $NH_4CF_3SO_3$ | 0.0008 | 0.07 | stable |

While several aspects of the present disclosure have been described and depicted herein, alternative aspects may be effected by those skilled in the art to accomplish the same objectives. Accordingly, it is intended by the appended claims to cover all such alternative aspects as fall within the true spirit and scope of the disclosure.

The present invention has been described in terms of some specific embodiments. They are intended for illustration only, and should not be construed as being limiting in any way. Thus, it should be understood that modifications can be made thereto, which are within the scope of the invention and the appended claims. Furthermore, all of the patents, patent applications, articles, and texts which are mentioned above are incorporated herein by reference.

We claim:

1. A method for preparing a substantially halogen-free polysilazane resin, comprising reacting a precursor polysilazane resin containing more than 1 wt % of halogen with hexaalkyldisilazane in the presence of a catalytic amount of at least one of a strong acid or a salt of a strong acid.

2. A method according to claim 1, wherein said precursor polysilazane resin contains between 1 wt % and 5 wt % of halogen.

3. A method according to claim 1, wherein said halogen is chlorine.

4. A method according to claim 1, wherein said strong acid is selected from trifluoromethanesulfonic (triflic) acid, perchloric acid, hydroiodic acid, hydrobromic acid, sulfuric acid, and fluorosulfuric acid.

5. A method according to claim 4, wherein said strong acid is selected from triflic acid and perchloric acid.

6. A method according to claim 5, wherein said strong acid is triflic acid.

7. A method according to claim 1, wherein said salt of a strong acid is an ammonium salt.

8. A method according to claim 7, wherein said salt of a strong acid is —$NH_4^{(+)}A^{(-)}$, wherein A is the conjugate base of a strong acid.

9. A method according to claim 7, wherein said salt of a strong acid is an ammonium salt of triflic acid.

10. A method according to claim 8, wherein said catalytic amount of at least one of a strong acid or a salt of a strong acid is between 0.001 wt % and 0.01 wt %.

11. A method according to claim 1, wherein said substantially halogen-free polysilazane resin contains less than 0.5 wt % halogen.

12. A method according to claim 11, wherein said substantially halogen-free polysilazane resin contains less than 0.25 wt % halogen.

13. A method according to claim 1, wherein said catalytic amount of at least one of a strong acid or a salt of a strong acid is between 0.001 wt % and 0.1 wt %.

14. A method according to claim 1, wherein said precursor polysilazane resin is formed by combining at least one organochlorosilane monomer and at least one silazane, primary amine, or ammonia, or combination thereof.

15. A method according to claim 14, wherein said organochlorosilane monomer is selected from the group consisting of phenyltrichlorosilane, diphenyldichlorosilane, methylphenyldichlorosilane, vinylmethyldichlorosilane, vinyltrichlorosilane, methyltrichlorosilane, silicon tetrachloride, and methylchlorodisilane.

16. A method according to claim 14, wherein said silazane is selected from the group consisting of hexamethyldisilazane, tetramethyldivinyldisilazane, and tetramethyldisilazane.

17. A method according to claim 1, wherein said precursor polysilazane resin is formed by combining at least one organochlorosilane monomer and at least one silazane.

18. A method according to claim 1, wherein said reacting is performed at a temperature between 80° C. and 150° C.

19. A method according to claim 1, wherein said reacting is performed under normal pressure under a dry inert gas.

20. A method according to claim 1, comprising reacting a precursor polysilazane resin containing between 1 wt % and 5 wt % of halogen with hexamethyldisilazane in the presence of between 0.001 wt % and 0.1 wt % of at least one of triflic acid or an ammonium salt of triflic acid, at a temperature between 80° C. and 150° C.

21. A method for preparing a substantially halogen-free polysilazane resin, comprising reacting at least one alkylchlorodisilane with an excess of at least one disilazane in the presence of a catalytic amount of at least one of a strong acid or a salt of a strong acid.

22. A method for removing halogen from a precursor polysilazane resin containing more than 1 wt % of halogen, comprising reacting said precursor polysilazane resin with hexamethyldisilazane in the presence of a catalytic amount of at least one of a strong acid or a salt of a strong acid.

* * * * *